United States Patent [19]

Heart et al.

[11] 4,130,865

[45] Dec. 19, 1978

[54] MULTIPROCESSOR COMPUTER APPARATUS EMPLOYING DISTRIBUTED COMMUNICATIONS PATHS AND A PASSIVE TASK REGISTER

[75] Inventors: Frank E. Heart, Lincoln; Severo M. Ornstein, Waban; William B. Barker, Maynard; William R. Crowther, Arlington, all of Mass.

[73] Assignee: Bolt Beranek and Newman Inc., Cambridge, Mass.

[21] Appl. No.: 620,131

[22] Filed: Oct. 6, 1975

Related U.S. Application Data

[63] Continuation-in-part of Ser. No. 476,546, Jun. 5, 1974, abandoned.

[51] Int. Cl.² .......................... G06F 9/18; G06F 15/16
[52] U.S. Cl. ..................................................... 364/200
[58] Field of Search ........................... 340/172.5; 364/200 MS File, 900 MS File

[56] References Cited

U.S. PATENT DOCUMENTS

| | | | |
|---|---|---|---|
| 3,416,139 | 12/1968 | Marx | 340/172.5 |
| 3,434,111 | 3/1969 | Schmidt et al. | 364/200 |
| 3,482,265 | 12/1969 | Cohen et al. | 364/200 |
| 3,483,522 | 12/1969 | Figueroa et al. | 364/200 |
| 3,543,242 | 11/1970 | Adams, Jr. et al. | 340/172.5 |
| 3,560,935 | 2/1971 | Beers | 340/172.5 |
| 3,566,363 | 2/1971 | Driscoll, JR. | 340/172.5 |
| 3,599,162 | 8/1971 | Byrns et al. | 364/200 |
| 3,665,404 | 5/1972 | Werner | 340/172.5 |
| 3,676,861 | 7/1972 | Ruth | 340/172.5 |
| 3,761,879 | 9/1973 | Brandsma et al. | 340/172.5 |
| 3,768,074 | 10/1973 | Sharp et al. | 340/172.5 |
| 3,787,818 | 1/1974 | Arnold et al. | 340/172.5 |
| 3,845,474 | 10/1974 | Lange et al. | 340/172.5 |
| 3,905,025 | 9/1974 | Davis et al. | 364/200 |
| 3,940,743 | 2/1976 | Fitzgerald | 340/172.5 |
| 4,000,487 | 12/1976 | Patterson et al. | 364/200 |
| 4,020,471 | 4/1977 | Woods et al. | 364/200 |

OTHER PUBLICATIONS

F. T. Birch et al., "Priority Determination and Servicing of I/O Devices" In *IBM Technical Discl. Bull.*, vol. 16, No. 3, Aug. 1973; pp. 874–876.

N. T. Christensen, "Self-Adjusting Priority Resolver" in *IBM Technical Discl. Bull.*, Vol. 17, No. 7, Dec. 1974, pp. 2050–2051.

N. T. Christensen, "Programmable Priority Mechanism" in *IBM Technical Discl. Bull.*, Vol. 17, No. 7, Dec. 1974; pp. 2052–2053.

*Primary Examiner*—Melvin B. Chapnick
*Attorney, Agent, or Firm*—Kenway & Jenney

[57] ABSTRACT

Computer apparatus which employs a plurality of processing units, a memory unit, and a communication unit, each of the units including a data transfer bus. A bus coupler is provided between each pair of units of differing type to form a distributed data communications network. An addressable, passive task register is associated with one of the units for communication through the couplers and is adapted to register a task priority value associated with a task request, the register being readable by any one of the processor units to obtain the highest priority value registry.

7 Claims, 4 Drawing Figures

MULTIPROCESSOR COMPUTER APPARATUS EMPLOYING DISTRIBUTED COMMUNICATIONS PATHS AND A PASSIVE TASK REGISTER

The invention herein described was made in the course of or under contract with the Department of the Army funded through the Advanced Research Projects Agency.

RELATED APPLICATION

This application is a continuation-in-part of application Ser. No. 476,546, filed June 5, 1974, entitled Method Of And Apparatus For Computer-Multi-Processor Communication And Operation, now abandoned.

BACKGROUND OF THE INVENTION

This invention relates to multiprocessor computer apparatus and more particularly to such apparatus which avoids any processor hierarchy and also avoids employing any centralized switching system.

As discussed in the above-identified patent application, various multiprocessor arrangements have been proposed heretofore. Various specific earlier attempts at a multiprocessor architecture are discussed in greater detail in the previously identified parent application. That discussion is incorporated herein by reference, but certain general considerations are repeated here for background information. As with the present invention, the purpose of such prior art multiprocessor arrangements was to increase computational power and speed by employing a plurality of processor units which would operate in parallel so as to obtain a data throughput greater than that achievable by a single processor operating at any achievable speed. With a few exceptions, most algorithms and computations typically handled by digital computers are susceptible of parallel processing. Further, since the cost of increasing processor speed increases sharply beyond a predetermined point, it can be shown that throughput above a corresponding level can be achieved more economically by employing a greater number of relatively slow processors than by increasing the speed of a single processor. Heretofore, however, these advantages have not been gained without incurring some considerable penalty in terms of system reliability and increases difficulty in programming. These offsetting penalties were typically due to hierarchial organization of the processors. One characteristic often contributing to reliability problems was the usual organizational arrangement where each communications or input-output device was associated with a given one of the processors. Thus, a failure in that one processor might cause the entire system to be unable to fulfill its overall intended purpose.

Among the several objects of the present invention, it may be noted the provision of a multiprocessor computer apparatus providing increased throughput; the provision of such apparatus which is flexible in capacity; the provision of such apparatus which is highly cost-effective; the provison of such apparatus which is highly reliable; the provision of such apparatus which is inherently modular in nature; and the provision of such apparatus which is of relatively simple and inexpensive construction. Other objects and features will be in part apparent and in part pointed out hereinafter.

SUMMARY OF THE INVENTION

Briefly, a computer system in accordance with the present invention involves a plurality of data processor units. The system also involves one or more system memory units of relatively large capacity and one or more communications units comprising the input/output interfaces for the entire system. Separate data couplers are provided between each processor unit and each system memory unit and also between each processor unit and each communications unit and between each communications unit and each system memory unit, thereby forming a distributed and modular data transfer or switching network. A passive task register is provided for registering a variety of task requests and, with each task request, a task priority value. The task register can be read by any processor to obtain the highest priority value registered. Accordingly, a system program incorporating instruction sequences of appropriate length, interspersed with instructions effecting reading of the task register, will be run by the system using all available processor units, essentially indiscriminately.

In accordance with one aspect of the present invention, the individual processors employed are preferably of the type which utilize a single bus through which essentially all data transfers are made. Examples of such processors are the Lockheed SUE TM computer, which utilizes the Lockhead INFIBUS TM data transfer system or the PDP 11 computer of the Digital Equipment Company, which utilizes the UNIBUS TM data transfer system. In systems of this type, essentially all devices and registers are communicated with through the single bus system and are addressed in essentially the same manner as memory locations. In single processor computer systems of this general type, the same bus serves as a communications path for data transfers to input-output devices and to bulk memory, such as tape and disc, as well as to the processor's random access memory.

BRIEF DESCRIPTION OF THE DRAWINGS

Corresponding reference characters indicate corresponding parts throughout the several views of the drawings.

DESCRIPTION OF THE PREFERRED EMBODIMENT

I. The Bus Systems

In the presently preferred embodiment of the multiprocessor computer apparatus of the present invention, which embodiment is described herein, the individual digital processors are Lockheed SUE TM processors of the so-called mini-computer type. Likewise, Lockheed INFIBUS TM data transfer systems are utilized for local data transfer. Accordingly, the following description assumes a familiarity with these commercially available units and with the interfacing conventions which are employed in communicating with and through these systems. Reference is made in particular to the Lockheed bulletin entitled SUE INFIBUS INTERFACE and designated General System Bulletin G4. Insofar as possible, signal designations and conventions have been utilized in the following description which are the same as or consistent with those employed in the Lockheed bulletin.

As suggested previously, a plurality of Lockheed INFIBUS TM systems are utilized. As is known, the physical configuration of each INFIBUS$^{TM}$ system is that of a back plane into which circuit cards carrying the different devices may be plugged. Although the several bus systems themselves are all essentially similar, the buses may conveniently be grouped into three classes or types in accordance with their utilization in the overall system. Firstly, a substantial number of the buses support processors, i.e. Lockheed SUE TM processors.

In that the bus permits a variety of data transfer paths to be established and permits any devices on the bus to initiate a request for the bus, it can be seen that more than one processor may be coupled to a bus and that each processor will, in effect, regard the other processor as merely another device on the bus, i.e. as it would regard a device of the class normally considered to be a peripheral. The processors may optionally have either a shared memory between them or respective memories considered separated by having different addresses respective to the different processors. With the particular components obtained from the Lockheed company, it has been determined by statistical methods that loss of processor speed due to conflicting requests for the bus is nominal with only two processors on the bus. The use of three processors on a single bus, while possible, is believed to incur a substantial loss in throughput so that increased power is better obtained by adding additional processor buses. Addition of a fourth processor on a single bus incurs an even further penalty so that the effective additional throughput is equivalent to less than one-half of that obtainable from a processor on a separate bus.

Figure 1:
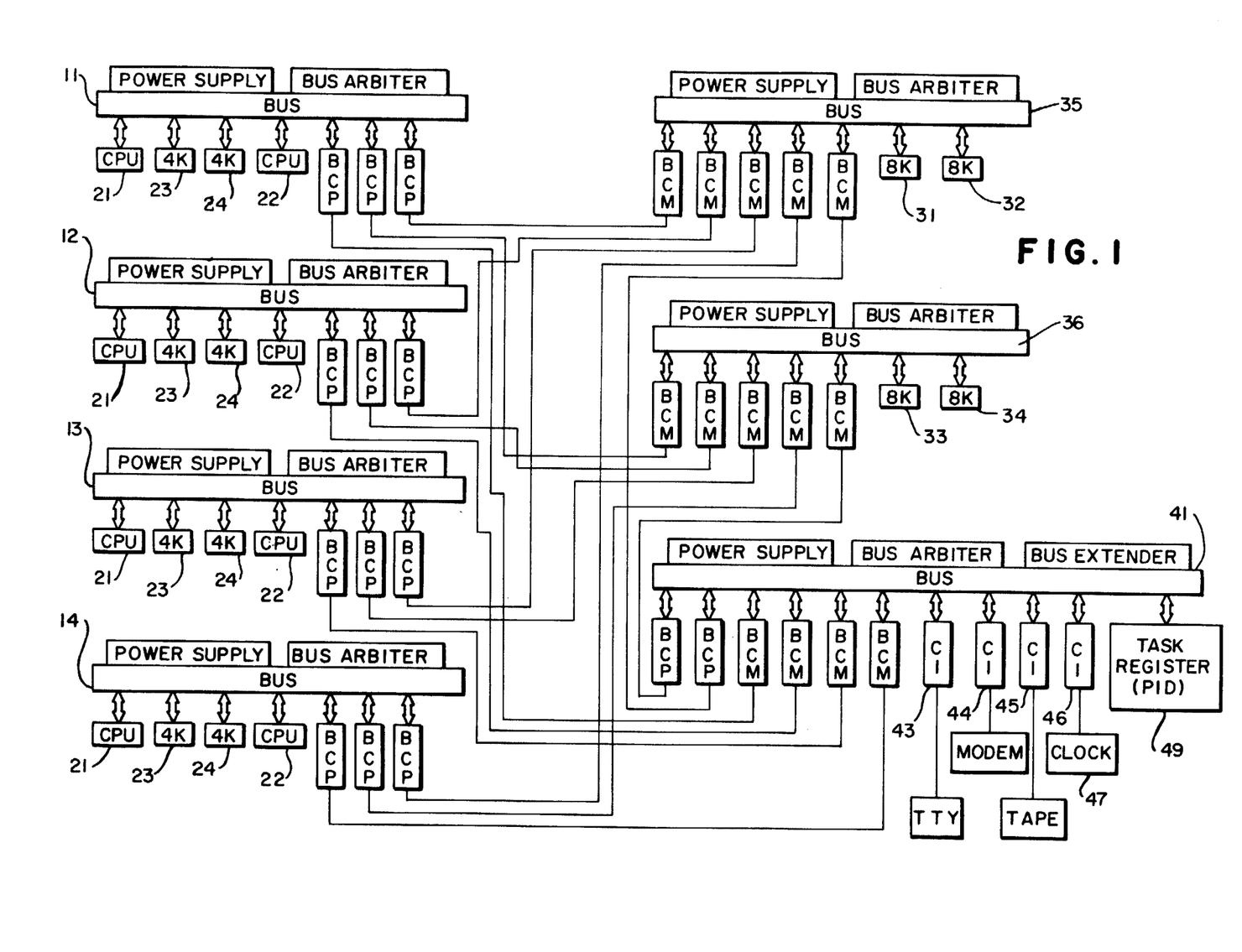
FIG. 1 is a functional block diagram of multiprocessor computer apparatus in accordance with the present invention.

In the example illustrated, there are four processor buses 11-14 and each bus supports two processors, designated 21 and 22. Associated with each processor, is a local random-access memory, designated 23 and 24 respectively, each processor obtaining access to its respective memory through the bus which is common to the two processors. The memory units 23 and 24 will typically be of relative small capacity, e.g. 4 K words.

As is understood, there is associated with each INFIBUS TM data transfer system a bus controller unit or arbiter which holds off new requests for the bus in the presence of previously occurring requests or simultaneous requests of higher priority. Likewise, there is associated with each bus a power supply which provides power to the various electronic units coupled to the bus.

Another class of bus or series of buses supports the main system memory. As illustrated, the system memory comprises four 8k memory units 31-34, paired on respective memory buses 35 and 36. A third class of bus or series of buses supports a communications interface or I/O (input/output) unit or system. In the embodiment illustrated, the communications interface comprises a pair of the INFIBUS TM units, which are interconnected by means of Lockheed bus extender units, so as to function essentially as a single bus. The composite extended bus is designated by the reference character 41. The various communications interface units which allow various peripherals, e.g. Teletypes, tape drives, modems and the like, to be coupled to the bus are designated 43-46. Preferably, one of the peripherals coupled to the communications bus is a clock 47 capable of providing various timing signals as described hereinafter.

II. The Bus Couplers

Data transfers between different types of units or classes of buses are accomplished by means of bus couplers. The bus couplers are constructed so that, at each end, they present themselves to the respective bus as just another device with a corresponding address. Thus, each end of the bus coupler is provided with the means providing an interface compatible with the Lockheed INFIBUS TM systems and thus can initiate a transfer of data on that bus or can be addressed by some other device on the bus responsive to a data transfer request initiated by that other device.

As described previously, the physical configuration of each bus type data transfer system is that of a back plane into which are plugged circuit cards which may carry processor modules; electronic memory units; I/O or modem circuitry; and the like. Correspondingly then, each bus coupler comprises a pair of circuit cards, each card containing the electronics for interfacing with the respective bus, and a flexible cable, connecting the two cards.

In the drawing of FIG. 1, the card at each end of a bus coupler is designated by a code indicating its function as follows BCP = Bus coupler, processor type end
BCM = Bus coupler, memory type end The cable connecting the two cards is in each case represented by a single line in the drawing for clarity of illustration.

At the outset, it may be noted that the bus couplers perform the following major functions, although it should be understood that not every bus coupler will in actual operation perform all these functions and that certain additional functions may also be implemented through some of the bus couplers.

Firstly, the bus couplers make available to any of the processors memory locations which are, in fact, directly addressable only to another bus, i.e. different from the bus supporting that processor. The principal way in which this function is utilized is in permitting a processor to read or write data into memory locations in the system memory, i.e. 31-34.

An associated function of the bus couplers is the mapping of memory or transposing of memory addresses so that the system address space may be substantially larger than the range of locations which may be directly addressed using the eighteen bit address scheme of the Lockheed SUE TM processors.

Essentially similar functions are provided between each processor bus 11-14 and the communication bus 41 so that each processor unit can address and receive data from the various input/output devices, e.g. those conventionally considered to be peripherals, as well as any other devices which are coupled to the communications buses.

In the foregoing brief description of each of the bus coupler functions, it has, to some extent, been assumed that the communication was provided at the initiation of a processor, through the respective processor bus, though the flow of data might be in either direction. A further function of bus couplers is, however, to provide for backwards requests. An example of such a backwards request is the use of the bus coupler upon initiation by a device on the communications bus to access memory on a processor bus. Again, the actual flow of data may be in either direction.

The bus couplers connecting the communications bus 41 to the memory buses 35 and 36 are similar to the bus couplers connecting each processor bus to the memory buses and provide essentially analogous functions. For example, the communications bus can request data from memory locations in the system memory and can similarly write into such locations. Thus, the coupler card at the communications end of a communications/system memory bus coupler is generally of the "processor" type rather than the "memory" type. Stated another way, the "forward" direction through these couplers is considered to be from the communications bus to the memory bus.

For the purpose of illustration, it is appropriate to describe in greater detail a bus coupler of the type which extends between a processor bus and one of the system memory buses since the other types of bus couplers are largely lesser included cases, omitting some of the functions of the processor bus/memory bus couplers. As indicated previously, each bus coupler comprises, in the preferred embodiment, a pair of circuit boards linked by a connecting cable. The electronics associated with the processor bus end of such a coupler are illustrated in FIG. 2 and the electronics associated with the system memory end of the bus coupler are diagrammatically illustrated in FIG. 3.

Figure 2:
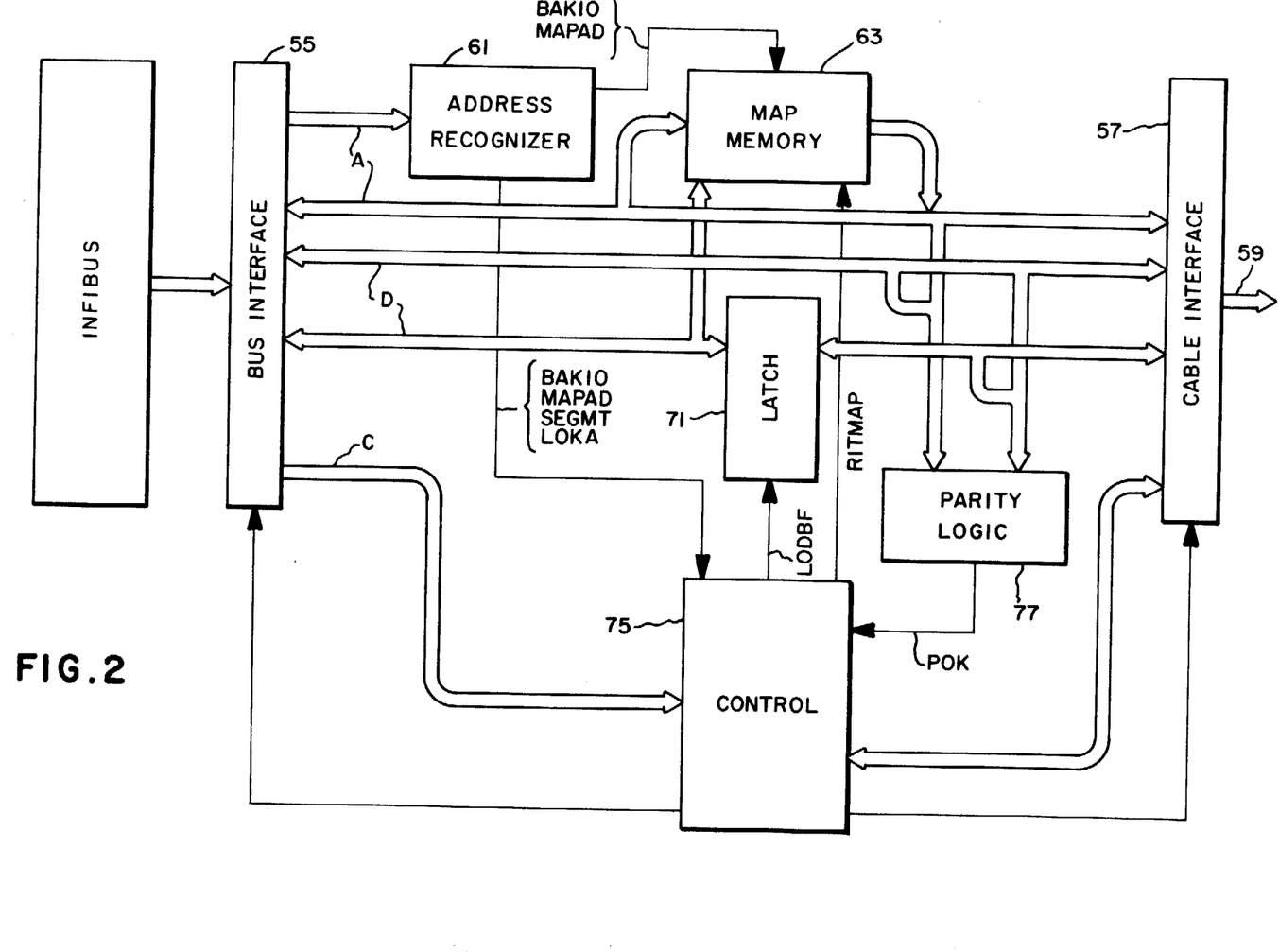
FIG.2 is a logic diagram of a processor-type bus coupler end employed in the apparatus of FIG. 1.

Referring now to FIG. 2, the bus interface electronics are indicated generally at 55, these being the drivers and receivers which permit the bus coupler to drive and receive signals from the bus lines in the same manner as any other device on the bus. Again, reference is made to the Lockheed System Bulletin G4 entitled SUE IN-FIBUS INTERFACE with respect to the standards to be applied in connecting a device to the Lockheed INFIBUS TM data transfer system. In the preferred embodiment, the circuitry shown in FIG. 2 and particularly by that indicated at 55 was constructed in accordance with the teachings of that handbook, employing to a large extent integrated circuits commercially available from Lockheed Electronics and other vendors.

As is understood, the signals communicated with the bus include an address, designated generally by the reference character A in the drawing; data, generally designated by the reference character D in the drawing; and a variety of control signals, designated by reference character C. Though these control signals are not for the most part involved in the substance of the present invention, they are identified and briefly defined in the following table, essentially the same information being available in the aforementioned Lockheed bulletin.

TABLE 1

| | |
|---|---|
| RITE | write operation |
| BYTE | byte operation |
| HCYC | half cycle operation |
| MRES | master reset |
| STRB | address/data strobe |
| DONE | successful completion |
| QUIT | abnormal completion |
| SRLD | access request |
| SELD | device select |
| SACR | select acknowledge |
| PCDA/B | precedence |
| HOLD | defer recognition |

As explained hereinafter, some of the signals communicated with the bus are processed or utilized within the bus coupler itself while substantial numbers of these signals are essentially passed directly through the bus coupler. In that the cable which connects the two circuits boards of the bus coupler may traverse a distance which is relatively great as compared with the typical signal path lengths within a single INFIBUS TM structure, the processor bus end of the coupler is provided with appropriate cable driver and receiver electronics, indicated generally at 57. These electronics provide, in conventional manner, the requisite source and load terminating impedances for sending digital signals over a substantial length of cable, the cable itself being indicated at 59. In order to minimize crosstalk and capacitive loading, the cable 59 is preferably of the flat, braided type.

A portion of the address signals, i.e. the higher order bits, are applied to an address recognizer 61. The address recognizer 61 is a decoder which is preset to recognize the address or range of addresses for which the particular bus coupler will be needed to be utilized.

The address recognizer, upon recognizing an address to which the bus coupler should respond, provides various output signals which identify the nature of the address recognized. These various control signals are listed in the following table together with brief description of their functions or significance.

TABLE 2

| | |
|---|---|
| BAKIO | I/O address |
| MAPAD | map address |
| SEGMT | common memory address |
| LOKA | lock address |

These control signals are provided to the control circuitry for the computer end of the bus coupler, this control circuitry being indicated generally at 75.

Of the remaining portion of the address, the less significant bits are passed directly through this end of the bus coupler to the cable driving electronics 57, while certain of the higher order of bits are applied to an address mapping memory 63. The address mapping memory employs these higher order bits of the applied address to select which one of several stored addresses is transmitted out over the cable to the other end of the bus coupler. By this means, the range of addresses which can be reached is effectively expanded. Further, since the address words stored in the mapping memory 63 can be changed under program control, as described hereinafter, the correspondence between local addresses on the processor bus and the actual addresses in main system memory can be easily rearranged or changed.

Data received from the processor bus is applied to a data latch or register 71 so that, as soon as the bus coupler has received and loaded the data, the coupler can release the bus from which the data was received under the direction of the signal LODBF from the control circuitry 87. Again, this is in conformity with the usual practice for connecting devices to the Lockheed INFIBUS TM data transfer system, as described in the previously identified Lockheed handbook. The latched data is then provided to the cable 59 through the cable interface 57. The more significant bits in the data are also made available to the address mapping memory 63.

The registers constituting the memory 63 have system addresses which are included within the range of those recognized by the address recognizer 61. When the address recognizer recognizes one of the addresses corresponding to the memory 63, the binary data made available from the data stream on the bus is loaded into the corresponding memory register, i.e. when enabled by the control signal designated RITMAP. Thus, the address mapping memory 63 can be loaded with data representing selected system memory addresses under program control. The entire collection of data and address signals are also applied to parity logic circuitry indicated generally at 77. This parity logic may be generally of the type described in U.S. Pat. No. 4,035,766 issued July 12, 1977 to William B. Barker and entitled Error-Checking Scheme. Assuming that the data includes one or more parity bits, the parity logic independently calculates the parity bit and compares the calculated parity bit with the transmitted parity bit and transmits a parity okay (POK) signal indicating that the parity bit is correct, if that is the case, this signal being provided to the control circuitry 75. If the parity is not correct, the control circuitry generates the signal designated QUIT, which signal may be generated under certain other failure conditions also consistent with the standard interfacing practices of the Lockheed INFIBUS TM system.

In addition to the data address signals which are passed on to the cable interface 57, various control signals are passed on to the cable interface, which control signals represent the state of the computer bus and bus coupler, and for the most part, are signals which correspond essentially directly with the control signals communicated with the corresponding computer bus. These control signals are listed and briefly identified in the following table.

TABLE 3

| | |
|---|---|
| CTREQ | transmitted request |
| CRREQ | received (backwards) request |
| CDONE | successful completion |
| CQUIT | abnormal completion |
| CHCYC | do half cycle operation |
| CBYTE | do byte operation |
| CLOCK | do lock operation |
| CRITE | do write operation |
| CPBLO/HI | parity bits |
| CBRES | reset (remote) |
| CPWRP | remote power is up |
| PSIN | power sense in |
| PSOUT | power sense out |

Figure 3:
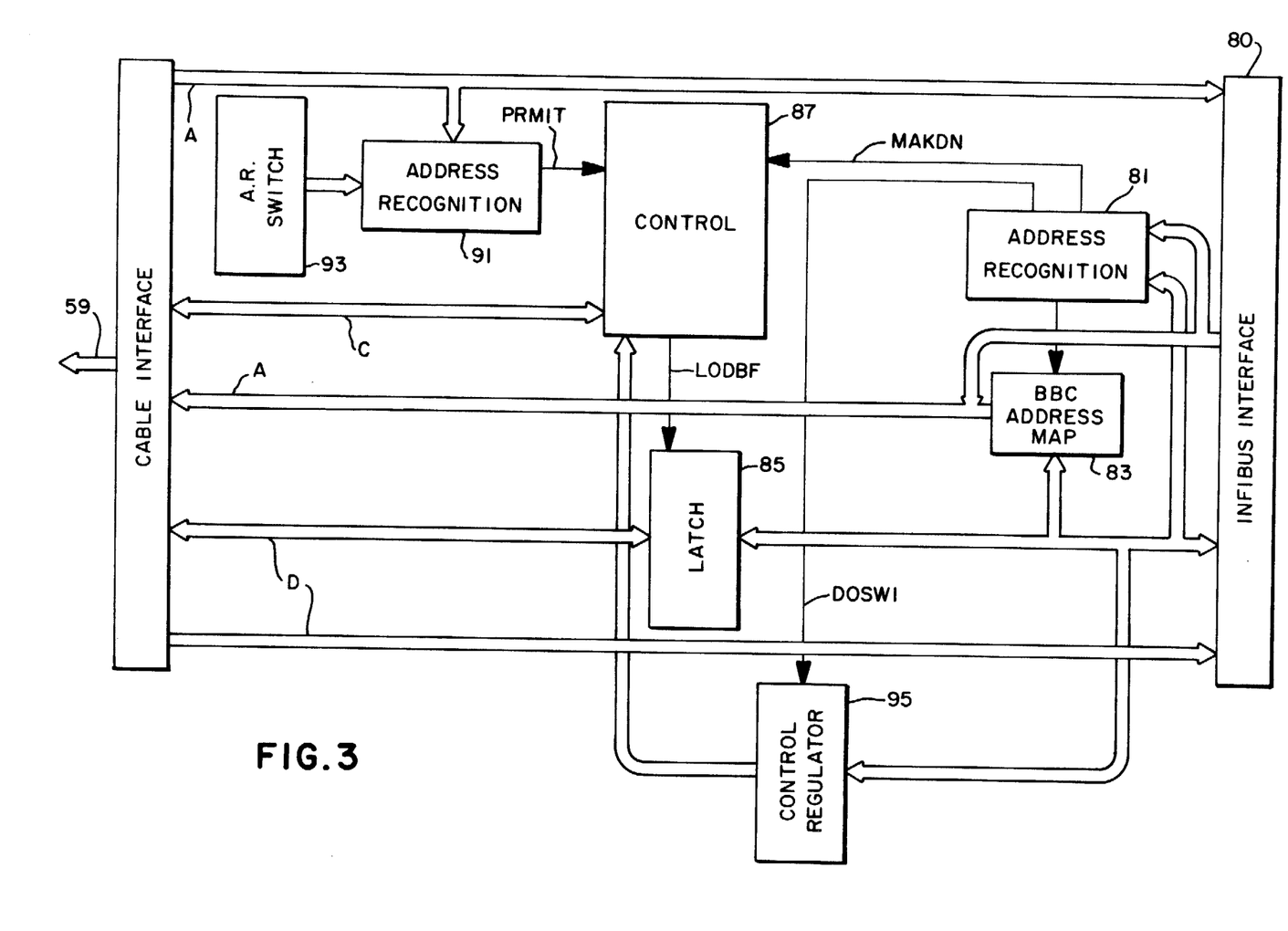
FIG. 3 is a logic diagram of a memory-type bus coupler end employed in the apparatus of FIG. 1.

The memory end of the bus coupler includes an address recognizing decoder 91 which is responsive to the address signals obtained from the cable interface, which decides that this reference is desired for this coupler and not some other. Since the range of addresses available through the corresponding memory bus is typically contiguous and predetermined in nature, the addresses may typically be recognized by means of the most significant bits upon matching with the setting of an address register switch, indicated at 93. Upon obtaining a match, a control signal designated PRMIT is provided to the control circuitry 87, which signal represents that address match has been obtained and that a request is being initiated to the memory bus.

The entire memory data stream is applied to a latch 85 so that when the bus coupler has acquired data from the bus through the bus interface circuitry 80 the memory bus itself can be released so as to be available for other data exchanges within the system memory unit.

In order to provide flexibility in the preselection of the control signals applied to the memory bus in response to various combinations of control signals on the coupler cable, the memory end of the bus coupler preferably allows the state of the control circuitry 87 to be altered and preselected by means of a control register, indicated at 95, which control register may be loaded from the data lines. The loading of this control register is preferably conditioned upon the recognition of an appropriate address and data pattern applied from the memory bus which causes an enabling signal DOSWI to issue from the address recognizer 81 to the control register 95. Accordingly, it may be seen that, by generating the appropriate address and data on the memory bus and by loading into the control register 95, a data format which disables the control circuitry 87, the memory bus may, in effect, cut off the processor at the other end of the cable.

As indicated previously, one aspect of the present invention contemplates that requests for data communications may be initiated at either end of the bus couplers. Accordingly, as illustrated in FIG. 3 the memory end of the bus coupler also includes address recognition circuitry as indicated at 81, and an address mapping memory 83, which memory may be loaded from the more significant bits of the data stream. Upon recognizing an address, the recognizer isues MAKDN to the controller. Control signals from both the bus interface and the cable interface are applied to control circuitry, indicated generally at 87, as with the bus coupler at the processor end.

This facility is used principally in generating so-called backward requests, i.e. requests initiated from the memory buses 35 and 36 or the communication bus 41 directed to a processor bus. A less apparent use for this capability, however, is in enabling a processor on one processor bus to address a processor on another bus. In other words, a processor on one processor bus can communicate through one of the respective bus couplers, to a memory bus and then, on that memory bus, generate a backward request through a bus coupler extending from the memory bus to another processor bus, to a processor on that other bus. In this way, one processor can address the control registers of a processor on a different bus.

As will be understood by those skilled in the art, these facilities mean that one processor, utilizing the appropriate codes, can set the control registers of bus couplers extending to another processor, thereby cutting off the availability of the memory bus to that other processor and, even further, can reach back up through the other processor's bus coupler from the memory buses so as to stop and reset that other processor. From the foregoing, it may be seen that the bus couplers provide a very powerful and flexible means of communications. Virtually any device on any bus may initiate a data exchange in either direction with a device on any other bus, although, in practice, not all paths are typically implemented.

As will be understood, the fastest communications occur when the device addresses another device on the same bus, e.g. a processor entering or extracting data from its own local memory. Thus, the programming of the system is preferably oriented so that most frequently used operations may be implemented entirely from local memory. Each processor does, however, have access to the relatively large system memory. To extract information from the system memory, a processor initiates a request to an address which activates the corresponding bus coupler. This bus coupler, in turn, communicates the request to the memory bus, presenting itself to that bus as though it were a device on the appropriate system memory bus. The data requested is provided to the bus coupler which then releases the memory bus and transmits that information back to the processor bus. While this data exchange procedure is obviously slower than transfers between devices which are, in fact, on the same bus, the time penalty has not been found to be particularly harmful since such accesses are required relatively infrequently in normal programming.

The extreme case of one processor attempting to reset another processor through a data communications path extending through two bus couplers is, or course, relatively slow. However, as will be understood by those skilled in the art, such communication paths will be called upon very infrequently, e.g. only in the event of reinitiating a processor in the group after an electronic or program malfunction of some sort or another.

A distinctive characteristic of this multiprocessor interconnection system is that the switching network which establishes the various data transmission paths is distributed and modular. Specifically, each processor bus has a separate bus coupler extending to each of the memory buses and also to each of the communication buses. Further, each end of each of the bus couplers presents itself to the corresponding bus in the same manner as just another device on that bus. Thus, the interface switching occurs at the end of the bus coupler in a manner entirely consistent with normal single-bus mini-computer systems.

In that this interconnection or switching system is modular and distributed, it is also quite flexible. There is no distinct impediment to adding or subtracting another processor bus, for example, or even another memory bus or communications bus. While the number of bus couplers tends to increase geometrically and there is thus some tradeoff involved in selecting the numbers of processor buses or memory buses and communication buses, there is no abrupt limit or sudden transition in the complexity or effectiveness of the system. Thus, a very high degree of flexibility or expandability is obtainable. An example of a configuration which has evolved using Lockheed components incorporates seven processor buses supporting thirteen processor units, each with an associated 4K local memory. Two system memory buses were used, each bus supporting two 8K memory units. Two expanded communications buses were utilized. This prototype machine was developed by Bolt, Beranek and Newman Inc. for the Advanced Research Projects Agency under Contract Nos. FO8606-75-C-0032 and FO8606-73-C-0027, ARPA Order No. 2351. Many details of the construction of this particular system using Lockheed subsystems are described in Reports Nos. 2930 and 2999 under these contracts. As such detailed information goes beyond the subject of the actual invention and would not be useful in designing a system in accordance with the present invention utilizing other makes of mini-computers, such information is not incorporated in the present specification except by reference to these documents which are of record.

An additional distinguishing characteristic of this interconnection system is that it is essentially non-hierarchical. No one processor is dominant over the others and, in operation, no processor normally exerts control over any of the others. Only in the extreme case, using highly protected code words, is one of the processors allowed, under program control, to stop and reinitiate another procesor or to replace the contents of the other processor's local memory. Likewise, in keeping with the non-hierarchical arrangement of the overall computer system, there is no particular association of each communications device, i.e. tape, drive, Teletypes, modems and the like, with any one processor. Rather, each processor has equal access to every communications device or, viewed from the other end, each communications device has an equal chance of being serviced by any one of the processors.

III. The Task Register (Pseudo Interrupt Device)

Rather than using a hierarchical arrangement of the several processors, the apparatus of the present invention employs an essentially passive hardware task registering device. This task registering device has been usefully described, in certain contexts, such as a psuedo-interrupt device (PID) since many of the tasks registered by the device correspond to interrupt signals generated by devices of the types normally considered as peripherals in single processor systems. In the preferred embodiment, the pseudo-interrupt device or task registering device is coupled and supported by each communications bus directly, as indicated at 49 in FIG. 1. As may be seen, there is no processor on the communications bus and interrupt signals generated on that bus by the various peripherals are received by the pseudo-interrupt device in place of such a processor.

In general, the operation of the psuedo-interrupt device is to register the fact that a task request has been made. Along with the fact of the request, the psuedo-interrupt device registers a value, which value indicates or corresponds to the priority level of the particular task request. The circuitry which provides these functions is diagrammed in FIG. 4.

As indicated previously, the pseudo-interrupt device (PID) is associated with and supported by the communications bus. As with most of the other elements of the system, the pseudo-interrupt device presents itself to the respective bus in the same manner as any other device or peripheral. However, as indicated previously, the psuedo-interrupt device is an essentially passive device and thus is only addressed by other devices and does not itself initiate or establish communication links through any bus or bus coupler. Thus, the bus interface indicated at 101 in FIG. 4 may be somewhat simpler in implementation. The psuedo-interrupt device responds to a limited number of addresses and, for this purpose, incorporates an address recognizer, indicated at 103. The address recognizer generates a limited number of control signals enabling corresponding components of the PID in dependence upon the particular address received. As described in greater detail hereinafter, the particular address to which the PID responds indicates whether the device is to register a task or is being read to discover what is the highest level task in the register at that point. Similarly, this information determines whether, after reading the highest level request, that request is to be reset or nullified.

Figure 4:
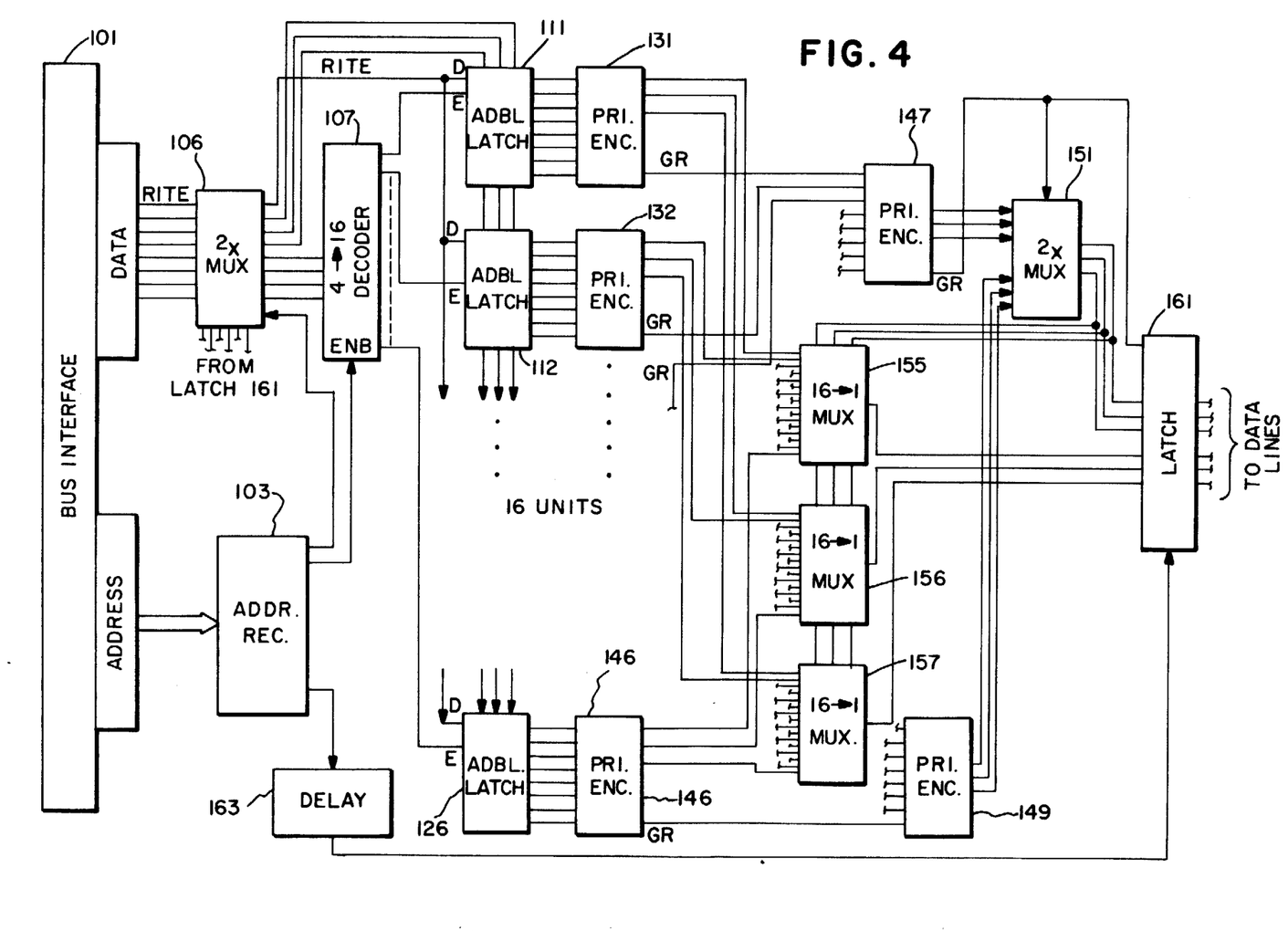
FIG. 4 is a logic diagram of a passive task register employed in the apparatus of FIG. 1.

When another device is seeking to enter a task in the task register of PID, seven bits of the data presented to the PID are taken as representing the priority level of the task. The priority level is represented in a conventional binary code so that 128 levels, e.g. zero through 127, are available. In practice, the zero level is always left in a set condition in that this has been found to facilitate programming of the overall system.

The four most significant bits of the priority level are applied to a four to sixteen line decoder 107. Each of the output signals from decoder 107 is applied as an enabling signal to a respective eight bit addressable latch 111-126. The three least significant bits of the priority level are applied in parallel to the address inputs of all of the addressable latches 111-126. The RITE signal which normally comprises part of the data provided over the bus in the Lockheed INFIBUS TM system is employed as the data bit to each of the latches. As will be understood, the latches 111-126 together provide an addressable register comprising a total of 128 individual latches or bits. When the PID is addressed, the address recognizer circuit enables the decoder 107 and a single one of the storage latches corresponding to the particular task priority level will be set to a one or a zero in dependence upon whether the write signal, designated RITE consistent with Lockheed INFIBUS TM convention, was present or absent. As will be understood, the presence of previously set bits within the register does not prevent any other bit from being set. Thus, the register will, at any one time, hold information designating all tasks which have been previously registered and not been taken care of, i.e. reset.

The eight output bits from each addressable latch 111-126 are applied to a respective priority encoder 131-146. Each priority encoder provides a group output signal designated GR if any one of the input signals is set and also provides a three line output which, in binary code, represents the latch address of the highest bit which is set. The group output signals corresponding to the eight most-significant of the latch circuits 111-118 are collected in a priority encoder 147 while the group outputs corresponding to the eight, less-significant latch circuits 119-126 are collected in a second priority encoder 149. The coded outputs from one or the other of the priority encoders 147 and 149 are selected by means of a three bit, two position multiplexer circuit 151, the selection being made under the control of the group output signal from the priority encoder 147 receiving signals from the higher order latches. The group output signal from the priority encoder 147 will be seen to indicate whether any bit is set in the upper half of the latches. If any such bit is set, the three output signals from the multiplexer 151 will represent, in binary code, which one of the latch circuits 111-118 contains the highest level bit.

Three sixteen line-to-one line multiplexer circuits 155-157 are employed to select which one of the priority encoders 131-146 will be read to obtain the three less significant bits defining the highest set level, the most significant bit from each encoder 131-146 being applied to the multiplexer 155; the next most significant bits to the multiplexer 156; and the least significant bit in each three bit code being applied to the multiplexer 157. The output signals from the three-bit, two-input multiplexer 151 are applied in parallel to control the selections made by the multiplexers 155-157.

The full seven bit code representing the highest set level of the individual latches in the latch circuits 111-126 is applied to a storage latch 161 which acquires this data and holds it for application to the data lines back through the bus interface through the multiplexer 106. In that the ripple through or settling time for the decoding network and the priority encoding tree structure may be significant, the latch 161 is normally enabled only following a predetermined delay following recognition of the corresponding address, this delay being provided as indicated at 163.

Summarizing then, the operation of the pseudo-interrupt device (PID) is, in general, as follows.

In order to enter a task into the PID, another device addresses the PID through the communications bus and enters on the bus data lines a value representing the priority level of the task. The address is recognized by the PID which responds by causing the individual latch corresponding to that priority value to be set. While more than one individual latch can be set, the priority tree continuously provides to the output latch 161 a seven bit code which represents the highest value which as been set. Thus, when the PID is interrogated through the bus, the data which is obtained, by the interrogating device through the bus, is the priority level of the task having the highest priority which has been registered. Since this value designation is already present on the data lines, a single step operation can be performed in which the value is read, the decoder 107 is enabled, thereby enabling the latches 111-126, and the RITE signal being at the reset level, so that the identified latch is reset, in effect, cancelling the entry of that task. In a preferred embodiment, this sequence is initiated by addressing the PID through a particular one of its several addresses and the address recognizer includes the minimal control circuitry necessary to effect the desired sequence of operations.

It is believed to be useful to again point out that, although the apparatus shown in FIG. 4 is conveniently referred to as a psuedo-interrupt device, it is, in fact, an essentially passive or slave device, i.e. it does not initiate data transfers on the bus. Rather, other devices can enter tasks in this task register and other devices can then interrogate the task register to find out whether any tasks require attention and to determine the priority level of the most immediate task.

IV. SYSTEM OPERATION

It should also be understood that tasks arising in various different ways can be entered in the psuedo-interrupt device. Many of the tasks will be entered by communcation devices on the communications bus, e.g. Teletype or modems, in essentially the same manner in which they would generate interrupt signals in a conventional single processor computer system. In the simplest case, the bus interface for the peripheral need be modified only to the extent that, in response to an interrupt request from the peripheral, the bus interface outputs a predetermined PID address and a predetermined value designating the task priority level. For the most part, reading of the psuedo-interrupt device will be initiated by one of the processors, i.e. through a bus coupler from the processor bus to the communications bus, the most usual event being that the processor will seek the task having the highest level, and will then go off to perform that task. Upon successfully locating and accepting the task, the processor will reset the corresponding level. In some cases, the priority level may uniquely identify a particular device requiring attention so that the resetting of the priority level can occur simultaneously with the reading and the processor will unambiguously be set upon a task. However, with lower level tasks which do not require as immediate attention, it is entirely possible to utilize the same priority level for several different tasks or several different devices which might register tasks. In this case, the inquiring processor can, after reading the task level, proceed to poll the several task sources which might register tasks at that level. If there is only one such task, the processor can then undertake that task and, in a separate operation, reset the corresponding latch in the task register.

The passive task register arrangement of FIG. 4 also possesses the desirable attribute that tasks can be registered by a processor under program control as well as by communications devices of the type which normally obtain service through interrupt signals. Thus, in programming the overall apparatus of the present invention, programs can conveniently be broken into sequences of optimum length even though an overall sequence is not completed. Upon completion of the short sequence, the program can have the processor set a task priority latch at a level corresponding to the urgency of completion of the rest of the program sequence and store appropriate pointers to enable picking up of the overall task. Having broken off the pre-existing overall sequence, the processor can then poll the PID to see if there are any higher level tasks, and can then pick up either these tasks or return to its original sequence, as required. Further, if the processor which, under program control, set the priority level designating the unfinished program task, has gone off to service a more urgent request, and in the meantime, another processor becomes free and polls the PID, this latter processor can pick up the program task which the first processor had initiated.

With the ability of the processors in the overall system to share programming tasks, it can be seen that the processors, as a group, are treated as a resource to be utilized by the overall system program and the psuedo-interrupt device, each processor being put to work as it becomes available. Further, since there is no heirarchical arrangement of the individual processors and there is no fixed association of any of the communications or other task spawning devices with any one processor, it can be seen that the failure of any one processor does not inherently disable the system but merely reduces the processing power, essentially pro rata.

One of the functions appropriately provided by the clock 47 is to periodically set a predetermined priority level in the task register, which level corresponds to and initiates a program segment which checks the status of all processors and any other components of the system. Assuming that this priority level is one of the highest, its execution is virtually assured if any of the processors are running properly. If no fault is detected, the segment can be quickly completed as understood by those skilled in the art. If faults or stoppages are detected, the program can branch and/or set other priority levels which initiate program sequences for determining the nature of the fault and restarting any processor whose operation may have been stopped by the fault.

As is understood, the processors also may incorporate various "time out" features which operate to detect various types of failures, e.g. those which would lock the processor in an unproductive loop.

In the preferred embodiment illustrated, each processor is, as noted earlier, provided with some local memory. In this local memory is preferably stored an operating program sufficient to enable each processor to look for work, so to speak, plus a sufficient library of programs to enable it to conduct a majority of its tasks without repeated reference to the main system memory.

The main system memory then can be utilized for user programs and the like. In general, the contents of the local memories for the several processors will be the same for all processors. However, it should be understood that a part of these memories will also be utilized in running these resource programs and conducting the arithmetic algorithms etc. and thus these portions of the contents of the memories will be continually changing as each processor runs a particular task.

A further advantage of this system organization is that it inherently provides a very great capability and flexibility for avoiding system failures due to failures in individual components. As indicated previously, the mere stopping of any one processor has a relatively insignificant effect on the system in that the processors are utilized as an expandable resource just as different sizes of memory may be utilized in more conventional systems. However, the system also has the possibility of restarting, or in the last analysis, cutting off a processor which behaves erratically. If the system program can detect the failure, e.g. the erratic writing of the processor in improper portions of memory, another processor can address the "sick" processor by addressing the control registers of the "sick" processor indirectly as described previously, i.e. through a data transfer path which includes two bus couplers and a third bus such as a system memory bus. The "sick" processor can in this way be stopped. Further, the correcting processor can attempt to reset the "sick" processor by appropriately loading its control registers and by restoring the background program in the respective local memory. If the failure is a continuing one, however, so that the processor cannot be successfully restarted and function in a normal way, the correcting processor can set the control registers of those bus couplers which permit communications with the processor bus supporting the "sick" processor, so as to block such communications initiated by that processor. The "sick" processor, together with all other devices on the same bus, will thus be cut off and isolated from the rest of the system. Again, however, this loss of resources need not cause the overall system to fail, since the system program can continue to utilize the rest of the processor and memory resources as they become available and can continue to run the system program effectively, although at reduced speed.

As will be understood by those skilled in the art, programming of a new computer system as described herein involves a developmental process extending over an appreciable length of time even though the hardware development may have essentially come to rest and the programming possibilities are manifest. At the time the present specification was being prepared, programming for the thirteen processor prototype machine described earlier herein had progressed to a substantial extent and two assemblers had been written, one adapted for running on a Digital Equipment Corporation PDP-1 computer and one adapted for running on a Digital Equipment Corporation PDP-10 computer. These assemblers and their usage are described in Report No. 2931 under the Advanced Research Projects Agency Contracts identified previously. Again, this detailed information is tied strongly to the particular prototype construction utilizing Lockheed SUE TM computers and is not general to the present invention. Accordingly, this information is incorporated by reference only.

As is brought out in the three ARPA reports referred to in the foregoing specification, the function for which the first multiprocessor prototype was designed was that of an IMP terminal in the ARPA communications network which links a variety of large computer centers spread across the country.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A multi-processor computer system comprising:
   a plurality of processor units, each unit including at least one processor and having a plurality of coupler interfaces through which data and addresses may be communicated;
   at least one random access system memory unit having a plurality of coupler interfaces through which data and addresses may be communicated and through which request signals may be applied to the memory unit;
   at least one communications unit interfacing with a plurality of input/output devices and having a plurality of coupler interfaces through which data and addresses may be communicated;
   between each processor unit and each of said system memory units, a respective coupler linking a processor interface to a respective memory interface;
   between each processor unit and said communications unit, a respective coupler linking a processor interface to a respective communications system interface, each processor unit being freely associable with any of said input/output devices;
   between each communications unit and each system memory unit, a respective coupler linking a communications interface to a respective memory interface, said couplers providing a distributed switching network permitting data communication between any pair of said processors, system memory, and communication units; and
   at least one addressable, passive task register associated with one of said units for communication through said couplers for registering a variety of task requests, each task request having a corresponding task priority value which is registered with the request, input/output devices operating to directly register corresponding task requests and values, said register being readable by any one of said processors to obtain the highest priority value registered,
   whereby a system program incorporating instruction sequences of preselectable length interspersed with instructions effecting reading of said task register will be run by said multi-processor computer system using all available processor units.

2. A multi-processor computer system comprising:
   a plurality of processor units, each unit having at least one processor and having a plurality of coupler interfaces through which data and addresses may be communicated;
   associated with each processor unit, a local memory with which the processor unit can communicate independently of its respective coupler interfaces;
   at least one random access system memory having a plurality of coupler interfaces through which data and addresses may be communicated and through which request signals may be applied to the memory;
   a communications unit interfacing with a plurality of input/output devices and having a plurality of coupler interfaces through which data and addresses may be communicated;
   between each processor unit and said system memory, a respective coupler linking a processor interface to a respective memory interface;
   between each processor unit and said communications unit, a respective coupler linking a processor interface to a respective communications unit interface, each processor unit being freely associable with any of said input/output devices; and
   at least one addressable, passive task register for registering a plurality of task request values, each value being independently settable and resettable, said task register including means for generating a code representing the highest value set, said register being readable by a processor to obtain said code,
   whereby, a system program incorporating instruction sequences of preselectable length interspersed with instructions effecting reading of said task register may be run by said multi-processor computer system using all available processor units.

3. A multi-processor computer system comprising:
   a plurality of processor units, each unit including at least one processor and having a data transfer bus providing a plurality of coupler interfaces through which data and addresses may be communicated;
   associated with each processor, a local random-access memory with which the processor unit can communicate through the respective bus independently of the respective coupler interfaces;
   at least one system memory unit having a data transfer bus providing a plurality of coupler interfaces through which data and addresses may be communicated;
   between each processor unit bus and said system memory bus, a respective bus coupler linking a processor bus interface to a respective memory bus interface;
   at least one communications unit having a data transfer bus adapted to receive means for communicating with a plurality of input/output devices and also a plurality of coupler interfaces through which data and addresses may be communicated;
   between each processor unit bus and said communications unit bus, a respective bus coupler linking a processor interface to a respective communications interface, each processor unit being freely associable with any of said input/output devices;
   associated with said communications unit, at least one addressable, passive task register for registering a variety of task requests, each task request having a corresponding task priority value which is registered with the request, input/output devices operating to directly register corresponding task requests and values, said register being readable by a processor through the respective bus coupler to obtain the highest priority value registered; and
   between each communications unit bus and said system memory bus, a respective bus coupler linking a communications bus interface to a memory bus interface, whereby, a system program incorporating instruction sequences of preselectable length interspersed with instructions effecting reading of said task register will be run by said multi-processor system using all available processors indiscriminately.

4. A computer system as set forth in claim 3 wherein each of the bus couplers linking processors interfaces to memory interfaces includes a memory for storing a cross-reference table for converting the respective processor addresses to overall system addresses.

5. A computer system as set forth in claim 3 wherein the values held in the task register are individually settable and resettable and wherein the task register includes means for resetting the highest value set upon reading of that value by a processor.

6. A computer system as set forth in claim 5 wherein said task register includes logic means for generating a code representing the highest task value set and said code is provided to a processor reading the task register.

7. In a multi-processor computer system in which tasks of varying levels of priority may be generated during the running of a program and by input/output devices, a task-keeping device comprising:
- an addressable latch including a plurality of individual elements which represent respective priority levels and are individually settable and resettable, said latch including;
- decoding means for setting a respective latch element when a task request including a coded priority value is communicated to the device;
- priority encoding means for generating an output code representing the highest level latch element which is set;
- interface means permitting a processor in the system to read said output code; and
- means for resetting the latch element represented by said output code upon reading of the output code by a processor.

* * * * *